US012023791B2

(12) United States Patent
Hasegawa

(10) Patent No.: US 12,023,791 B2
(45) Date of Patent: Jul. 2, 2024

(54) NAIL TIP GUIDE TOOL FOR NAILING MACHINE

(71) Applicant: FUJITOMI CORPORATION, Ikeda (JP)

(72) Inventor: Takeo Hasegawa, Ikeda (JP)

(73) Assignee: FUJITOMI CORPORATION, Osaka (JP)

( * ) Notice: Subject to any disclaimer, the term of this patent is extended or adjusted under 35 U.S.C. 154(b) by 94 days.

(21) Appl. No.: 17/796,964

(22) PCT Filed: Feb. 5, 2021

(86) PCT No.: PCT/JP2021/005387
§ 371 (c)(1),
(2) Date: Aug. 2, 2022

(87) PCT Pub. No.: WO2021/157747
PCT Pub. Date: Aug. 12, 2021

(65) Prior Publication Data

US 2023/0056376 A1 Feb. 23, 2023

(30) Foreign Application Priority Data

Feb. 8, 2020 (JP) ................................ 2020-032346

(51) Int. Cl.
*B25C 3/00* (2006.01)
*B25C 7/00* (2006.01)

(52) U.S. Cl.
CPC ................ *B25C 3/002* (2013.01); *B25C 7/00* (2013.01)

(58) Field of Classification Search
CPC ........... B25C 3/002; B25C 7/00; B25C 1/188; B25C 1/00; B25C 1/008; B25C 1/047;
(Continued)

(56) References Cited

U.S. PATENT DOCUMENTS

2004/0050899 A1 3/2004 Canlas et al.
2006/0157527 A1 7/2006 Yamamoto et al.
2011/0174859 A1* 7/2011 Zhou ....................... B25C 1/184 227/144

FOREIGN PATENT DOCUMENTS

JP 48-34981 U 4/1973
JP 51-79783 U 6/1976
(Continued)

OTHER PUBLICATIONS

Official Communication issued in International Patent Application No. PCT/JP2021/005387, mailed on Aug. 18, 2022.
(Continued)

*Primary Examiner* — Veronica Martin
(74) *Attorney, Agent, or Firm* — Keating & Bennett, LLP

(57) ABSTRACT

A nail tip guide tool is attached to an end of a nose of a nailing machine to provide guide pieces on a bottom surface inside same, the nail guide tool having a lower portion in a funnel shape. The top surfaces of the guide pieces have a recess in a mortar shape when brought together at the center of the funnel shape by a press board member biased by a coil spring. The guide pieces are used so that in the nose, the tip of a nail in an inclined posture is guided to a center of the mortar shape and is inserted thereamong, and correcting the posture thereof. For fastening a metal piece with a nail, distal ends of the guide pieces are structured to form a conical shape, and with this portion having been fitted into a pilot hole of the metal piece, the nail is struck.

6 Claims, 10 Drawing Sheets

(58) Field of Classification Search
CPC ......... B25C 1/001; B25C 1/003; B25C 1/184; B25C 1/005; B25B 23/10; B25B 21/002; B25B 23/06; B25B 23/0064; B25B 23/08; B25B 23/04
See application file for complete search history.

(56) References Cited

FOREIGN PATENT DOCUMENTS

| | | | |
|---|---|---|---|
| JP | 06-339874 | A | 12/1994 |
| JP | 3655173 | B2 | 6/2005 |
| JP | 4348995 | B2 | 10/2009 |
| JP | 5340812 | B2 | 11/2013 |

OTHER PUBLICATIONS

Official Communication issued in International Patent Application No. PCT/JP2021/005387, mailed on Jul. 28, 2022.
English translation of Official Communication issued in International Patent Application No. PCT/JP2021/005387, mailed on Apr. 20, 2021.

* cited by examiner (a)

(b)

(a)

(b)

NAIL TIP GUIDE TOOL FOR NAILING MACHINE

TECHNICAL FIELD

The present invention relates to a device that enables a nailing machine to drive out a nail in a favorable posture.

BACKGROUND ART

Nailing machines are widely used in which a driver (striking rod) connected to a piston that is driven by compressed air is used to drive out a nail in an injection port. A plurality of nails to be driven out are stored in a connected state in a magazine provided at a lower portion of the nailing machine, and the nails are sent one by one into a nose and driven out sequentially.

Incidentally, in such nailing machines, since the inner diameter of the nose is larger than the outer diameter of a head portion of the nail to be driven out, the nail is often in a state of being tilted with respect to the axis of the nose, and if this nail is driven out by the driver, in many cases, the nail is driven into a mounting material in a tilted state, and inconveniences such as the nail being mounted in a bent state after mounting often occur.

In order to solve such a problem, various methods as shown in the following patent literature, for example, have been proposed.

CITATION LIST

Patent Literature

PTL 1: Japanese Patent No. 5340812 (P5340812)
PTL 2: Japanese Patent No. 4348995 (P4348995)

SUMMARY OF INVENTION

Technical Problem

In the inventions relating to the nailing machine described in PTL 1, at the tip portion of the nailing machine related to the nail tip guide tool of the present invention, there is provided a structure for driving the nail into a mounting material straight without diagonally driving the nail.

Further, the guide mechanism described in PTL 2 has a feature that a ratchet member formed of an inclined surface that guides the tip of the nail into an injection port and a guide surface that guides the tip of the nail shaft to the center of the injection port is provided to be biased such that the guide surface protrudes into the injection port, a guide protrusion that can be inserted into a lower nail hole of a metal fitting for construction such as reinforcing hardware, as a mounting material, is formed to face downward, and the tip portion of the nail can be driven along the guide protrusion.

However, the nailing machine described in PTL 1 has a problem that it is structurally large and a correction cannot be made depending on a tilting direction of the nail. Further, the guide mechanism described in PTL 2 has a problem that the structure of the injection port is complicated and it tends to be large in terms of a device. In addition to the above, many proposals have been made. However, they have advantages and disadvantages, and there are still practical problems.

The present invention has an object to provide a guide device which is structurally simple and can reliably correct an inclination of a nail.

Solution to Problem

In order to solve the above problems, the present invention adopts a configuration as in FIG. 1. In the configuration, a nail tip guide tool 8 by a hollow container 9 having a funnel-shaped lower portion and having, at both upper and lower end portions, opening portions equal to or larger than an inner diameter of a nose portion is mounted to an end portion of the nose portion 5, a plurality of guide pieces 14, which correct a tip of a nail that has passed through the nose and been driven in an oblique posture to a straight posture, are provided on an inner bottom surface 12 of the funnel-shaped container 9 in a circular shape and in a state where central portions are gathered together, and a mortar-shaped recess portion 17 is formed on an upper surface portion of the aggregate of the plurality of guide pieces 14, so that the tip of the oblique nail is guided to a center of a mortar-shaped lower portion and the nail is interposed in the central portion of the aggregate of the gathered guide pieces to push and expand the plurality of guide pieces in the right-left direction.

The bottom surface 12 of the funnel-shaped container member and the bottom surface of the guide piece that is in contact with the bottom surface 12 are formed as inclined surfaces whose center side is lowered, a torus-shaped press board 16 (FIG. 9) is placed on the upper surface of the guide piece, and a coil spring 15 is provided on the upper surface of the press board 16 so as to press the press board downward, so that the plurality of guide pieces are biased in a direction of contracting the guide pieces toward the central portion.

If the lower end portion of the guide piece is caused to protrude in a conical shape 23 below the lower end portion of the funnel-shaped container member, when driving the nail into a member which has a prepared hole 20 formed in advance and is used for reinforcing hardware or the like of a building, the portion protruding into the prepared hole acts as a nail tip dummy, so that the member can be easily mounted by inserting the dummy portion 23 into the prepared hole 20 and then driving the nail, and on the contrary, if the lower end portion of the guide piece is located at the same level as or above the lower end portion of the funnel-shaped container member, nailing to a generally used flat mounting material can become easy (refer to FIGS. 1 and 2).

Advantageous Effects of Invention

As described above, since the funnel-shaped container member 9 having a hollow container shape is provided at the lower end portion of the nose portion by screwing and the plurality of guide pieces are provided inside thereof in a state where each guide piece can be expanded and contracted in a radial direction and is biased to a contraction side by the torus-shaped press board member (FIG. 9) using the coil spring, the nail in the nose portion 5 is guided to the center side of a passage by the guide pieces and the posture of the nail is corrected such that the nail passes through the central portion of each guide piece. The number of guide pieces forming the nail tip guide portion in this case is preferably 3 or 4.

As described above, the nail tip guide tool 8 of the present invention can be easily mounted to various nailing machines by screwing (FIG. 16), as is clear from the sectional view of FIG. 3, and also when mounting the metal reinforcing hardware 19 as a mounting material for reinforcing a structure that is often used in construction, it is possible to easily and efficiently perform work by using the guide piece type (FIG. 2) described above. Further, by using the nail tip guide tool (8) having the cross-sectional shape in FIG. 1, there is obtained a convenient effect that various types of nails can be straight and correctly nailed, without bending, into a base material to which a mounting material of a generally used material capable of being nailed is nailed.

DESCRIPTION OF EMBODIMENTS

Hereinafter, embodiments of the present invention will be described based on the drawings. In each of the following drawings, description is made as the piston side set to be up and the nose side, where a nail is driven out, set to be down, and the same applies to the sideways and diagonal directions.

FIG. 16 is an overall diagram showing an outline of a nailing machine, and a nailing machine 1 has a body portion 3 provided at a front portion of a grip portion 2 that is connected to an air supply source, and a piston that is operated by compressed air and a driver member (striking rod) 4 for striking are provided in the interior of the body portion 3.

A nose portion 5 forming a passage for a nail that is driven is provided at a lower portion of the body portion 3, and a supply port for supplying the nail, which is a driven material, is provided in a side portion of the nose portion 5. Nails 6 are stored in a magazine 7 as an aggregate of the nails connected one by one, and when the nail is moved into the nose, in a state where the connected nails are disconnected and separated one by one, the nail is driven into a mounting material through an injection port below the nose portion.

Example 1

FIGS. 3 to 8 show “Example 1”, and in a case where the mounting material made of a wood-based material, which is generally frequently used, is to be nailed to a base structural material or the like, a “nail tip guide tool 8” is mounted to an end portion of the nose portion 5 through a lid member 10 of a funnel-shaped container member forming the nail tip guide tool 8. In FIG. 1, a funnel-shaped container member 9 is joined to the lid member 10 of the funnel-shaped container member by a screw thread 26 provided at an upper end portion thereof and is mounted as the nail tip guide tool 8 by screwing it to a screw thread portion 11 provided at an outer peripheral portion of a lower end of the nose portion 5, as shown in FIG. 3 and the like. If the funnel-shaped container member 9 is made detachable in this manner, since it can be removed from this portion as needed, it is convenient for replacement or repair of a main body of the “nail tip guide tool”, a guide piece, or the like.

An inclined bottom surface portion 12 inclined downward is provided at a bottom portion of the funnel-shaped container member 9. The angle of the inclined bottom surface is approximately 45°, and the angle of the outer inclined surface is also set to 45°. An opening portion 13 that serves as a nail passage is provided at the central portion of the bottom portion of the funnel-shaped container member 9. The opening portion 13 is formed to be slightly larger than the diameter of a nail head.

A nail tip guide piece 14 is placed on the funnel-shaped container member 9. The four guide pieces 14 each having a fan shape when viewed in plan view (FIG. 3) are provided, the upper surface thereof is pressed by a torus-shaped press board 16 connected to the lid member 10 of the funnel-shaped container member through a coil spring 15, each guide piece 14 is movably supported in a state where the inclined bottom surface of the funnel-shaped container member 9 and the inclined lower end surface of the guide piece 14 are in close contact with each other, a recessed rail L (FIG. 9) provided on the lower surface of the press board 16 and a protrusion portion F (FIG. 15) on the upper surface of the guide piece 14 are slidably fitted to each other, and the four guide pieces are in a gathered state on the circumference.

A mortar-shaped guide recess portion 17 is formed at the central portion of the upper surface of the aggregate of the four guide pieces that are in a gathered state on the circumference, and in the case of Example 1, at the central portion of the recess portion, a narrow round hole 24 having a diameter smaller than the shaft diameter of the nail 6 to be driven is provided to penetrate to the lower surface of the aggregate of the guide pieces 14. The through-hole 24 has the effect of making it easier for the tip of the nail 6 to be interposed in a case where the tip of the nail 6 driven in a tilted posture from the nose 5 slides to the center of the mortar shape along the inclined surface of the mortar shape and also has the good effect that in a case where the nail shaft or a nail head 21 tries to push and expand the four guide pieces 14 to the right and left after that, the dimension to be expanded is reduced by the dimension of the hole diameter.

Example 2

In this example, as shown in FIG. 2, the lower end portion of the guide piece 14 protrudes downward through the opening portion 13 of the bottom surface portion of the funnel-shaped container member. Then, a conical protrusion portion 23 of the guide piece 14 is fitted into a round hole 20 of an L-shaped reinforcing metal fitting 19 for reinforcing the mounting of a structural material 18 and positioned, and the nail 6 is driven and fixed by the nailing machine (refer to FIGS. 10 to 13).

In the nail tip guide tool 8 of the present invention, as shown in d of FIG. 13, in a state where the nail 6 does not exist, all the guide pieces 14 are gathered at the center to form a circle, and the guide pieces are in a state of being gathered together. In this state, the mortar-shaped guide recess portion 17 is formed on the upper surface, and the nail 6 that has entered in a tilted posture from the nose portion 5 on the upper side is guided to the central portion along the inclined surface of the guide recess portion 17 (refer to FIG. 10).

Since the upper end of the nail 6 is pressed downward by the driver member 4, the tip portion of the nail 6 enters the central portion of the aggregate of the plurality of guide pieces 14 (b in FIG. 11). In this way, naturally, the nail shaft becomes straight, and at this time, all of the plurality of guide pieces are pushed and expanded to the right and left, so that each guide piece 14 rises along the inclined bottom portion 12 of the funnel-shaped container member 9.

Since the tip of the nail 6 is sharp, there is an advantage that the nail 6 can easily enter the central portion of the aggregate of the plurality of guide pieces. However, if the tip of the nail 6 is not so sharp, it does not matter. If the nail 6 continues to be pushed in by the driver member 4 in this state, the nail 6 enters the mounting material through the opening portion 13 and is driven until the flanged nail head 21 is eventually flush with the surface of the reinforcing metal fitting 19 (c of FIG. 12).

The upper surface of the guide piece 14 is pressed by the press board 16 connected to the inward flanged lid member 10 of the funnel-shaped container member 9 through the coil spring 15, and the guide piece 14 is movably supported in a state where the inclined bottom surface 12 of the funnel-shaped container member 9 and the inclined lower end surface of the guide piece 14 are in close contact with each other. The recessed rail L provided on the lower surface of the press board 16 and the protrusion portion F provided on the upper surface of the guide piece are slidably fitted to each other, and the plurality of guide pieces 14 can be expanded and contracted in an orderly manner.

As described above, according to the nail tip guide device according to the present invention, it becomes possible to maintain a favorable posture of the nail that is driven, with a relatively simple structure.

REFERENCE SIGNS LIST

Figure 1:
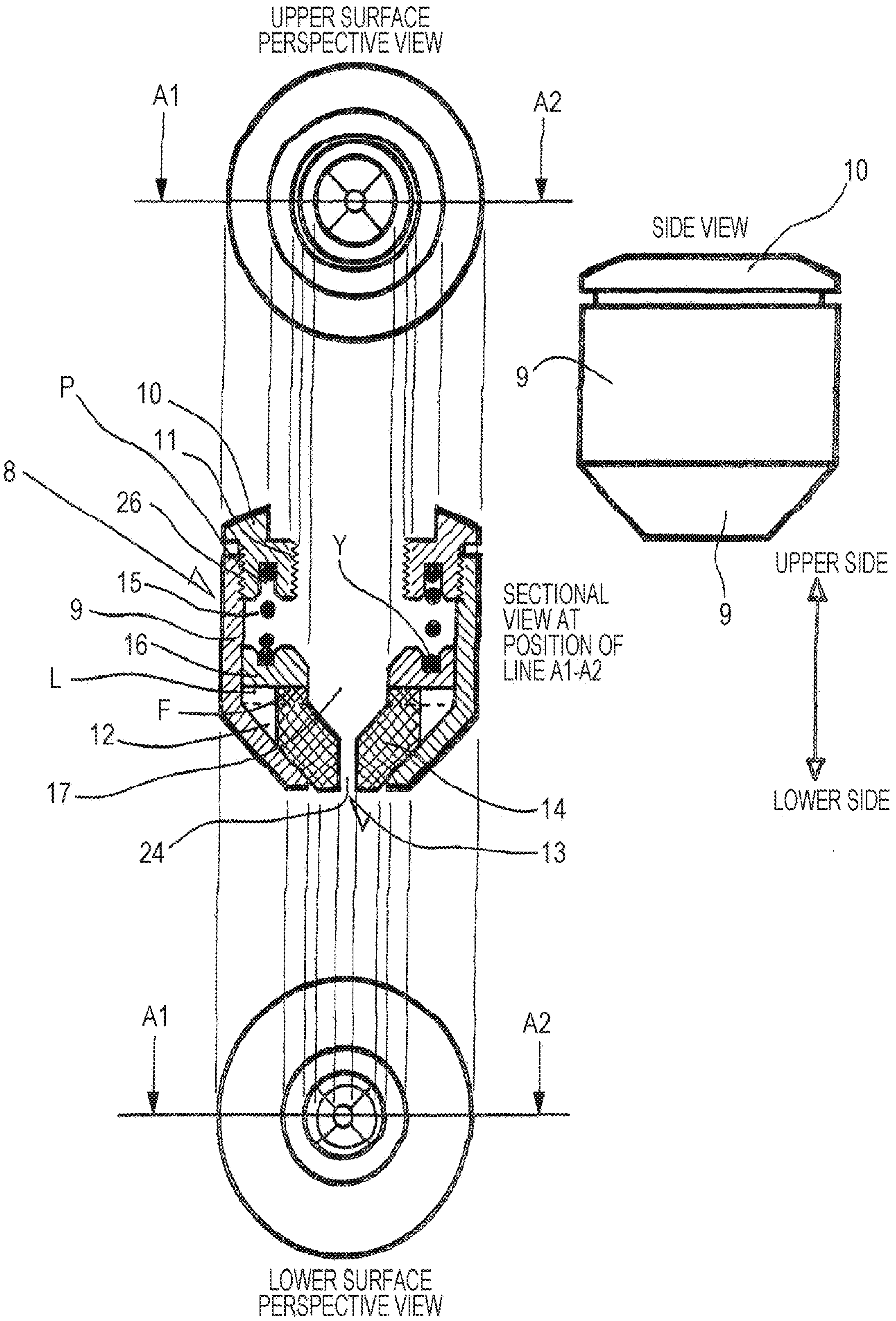
FIG. 1 is a sectional view, a side view, and upper surface and lower surface perspective views of a nail tip guide tool used in "Example 1".
Figure 2:
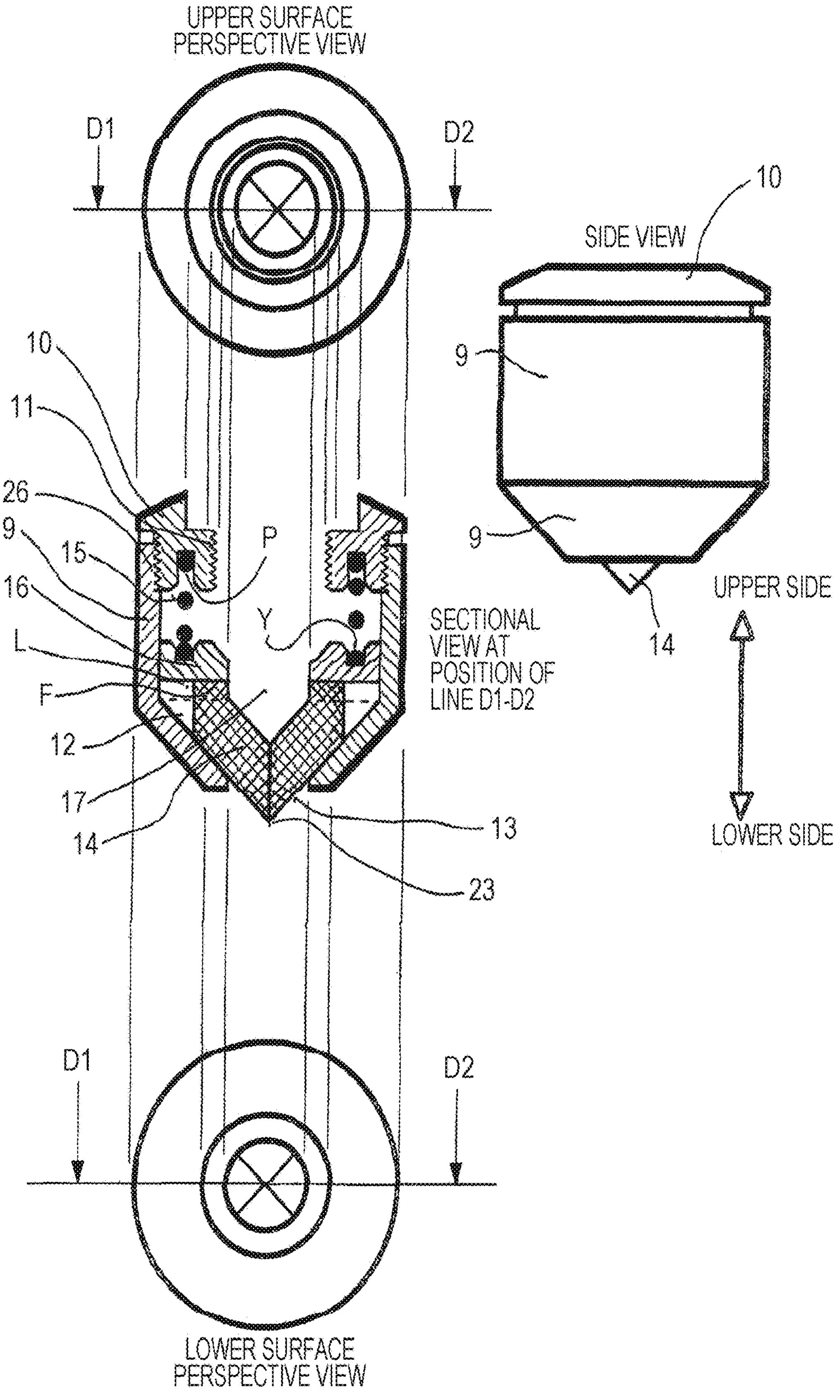
FIG. 2 is a sectional view, a side view, and upper surface and lower surface perspective views of a nail tip guide tool used in "Example 2".
Figure 3:
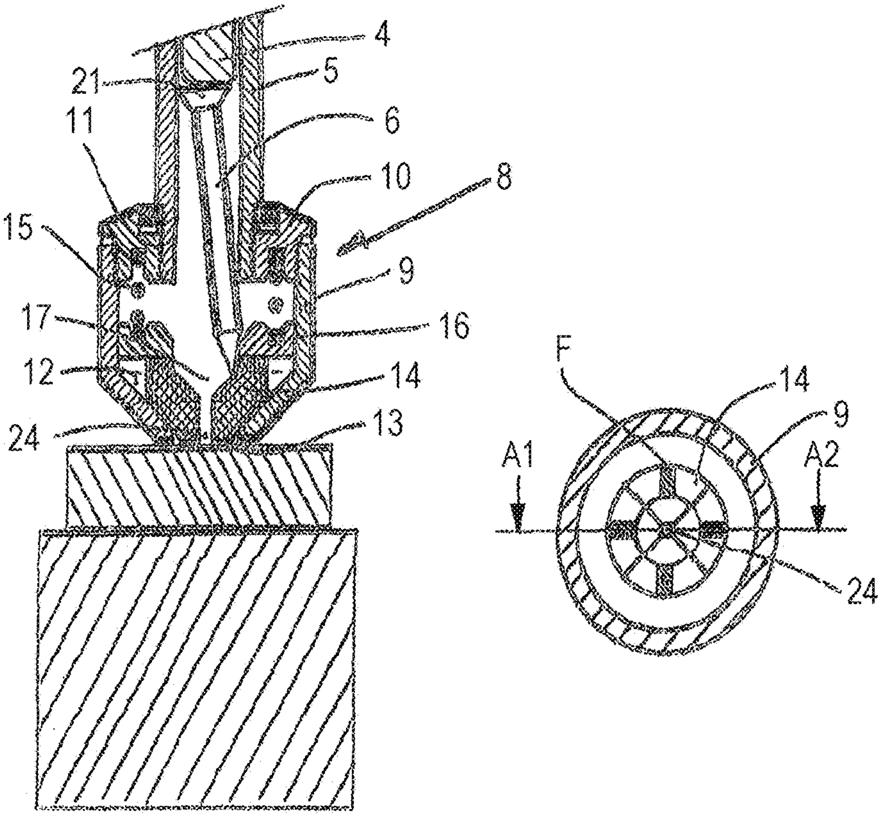
FIG. 3 is a sectional view at a portion along line A1-A2 of the nail tip guide tool and a positional plan view of a guide piece 14 showing a state at a point in time a (at the time of the start of nailing) in a work process of "Example 1".
Figure 4:
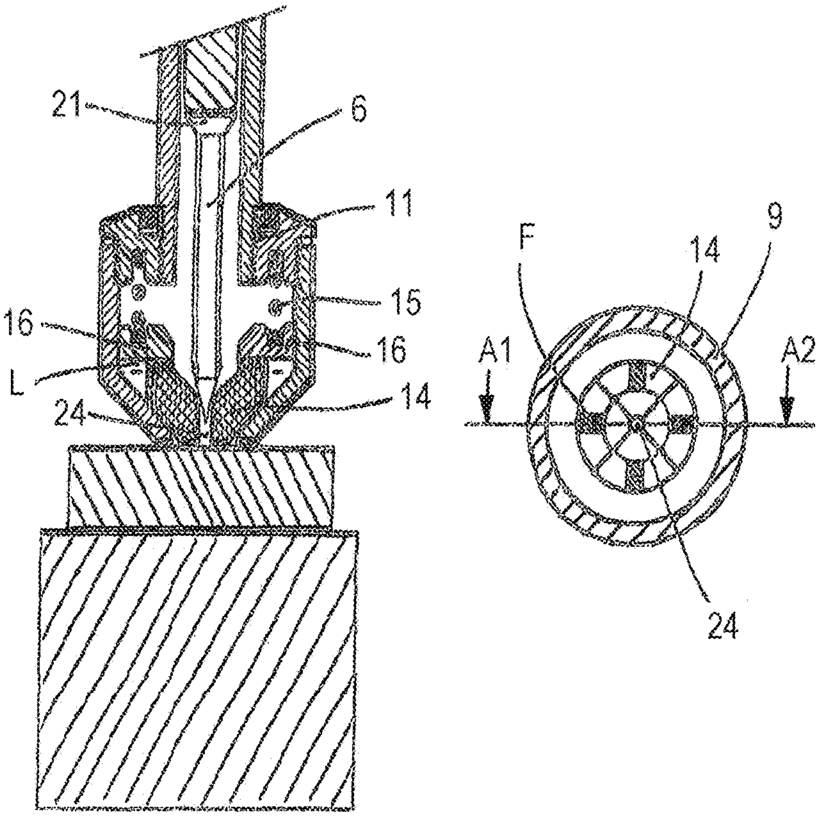
FIG. 4 is a sectional view at the portion along line A1-A2 of the nail tip guide tool and a positional plan view of the guide piece 14 showing a state at a point in time b in the work process of "Example 1".
Figure 5:
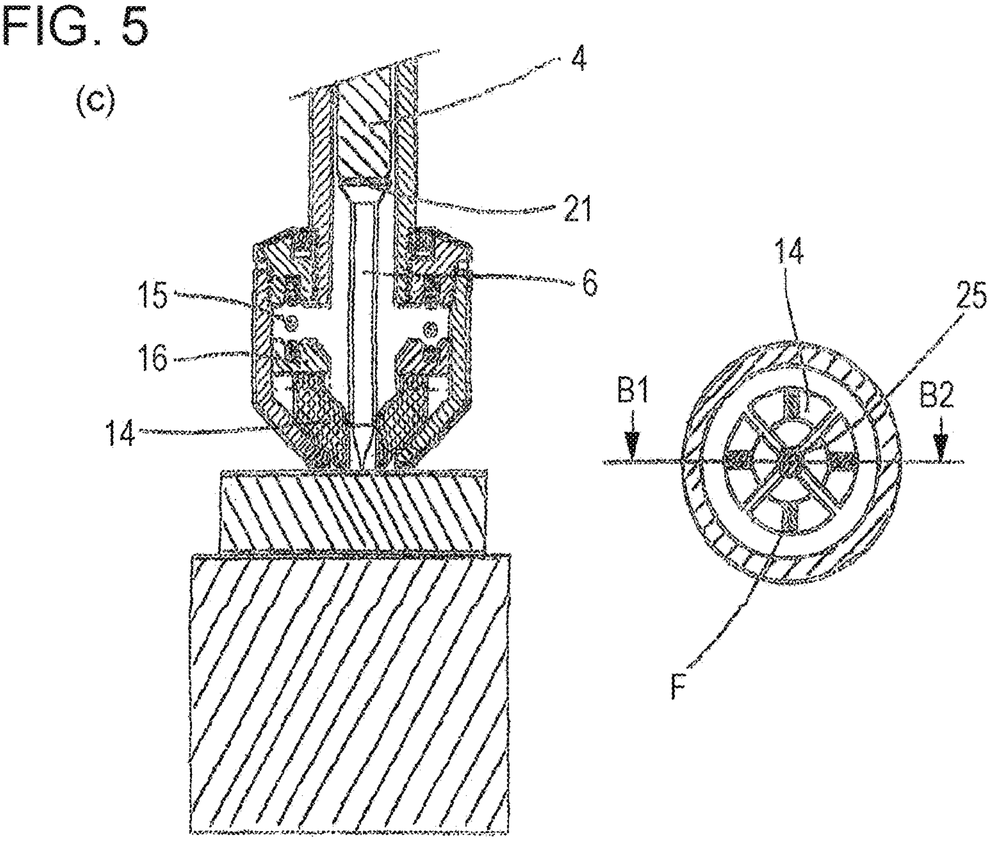
FIG. 5 is a sectional view at a portion along line B1-B2 of the nail tip guide tool and a positional plan view of the guide piece 14 showing a state at a point in time c in the work process of "Example 1".
Figure 6:
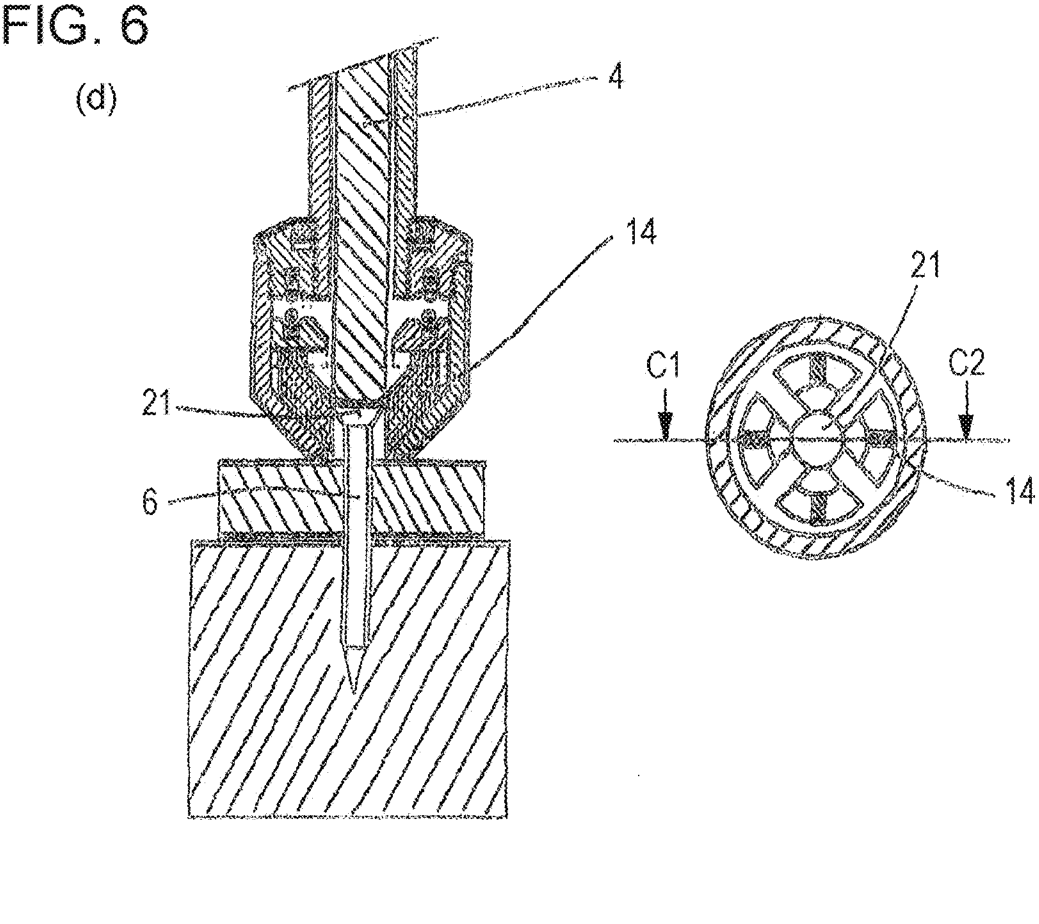
FIG. 6 is a sectional view at a portion along line C1-C2 of the nail tip guide tool and a positional plan view of the guide piece 14 showing a state at a point in time d in the work process of "Example 1".
Figure 7:
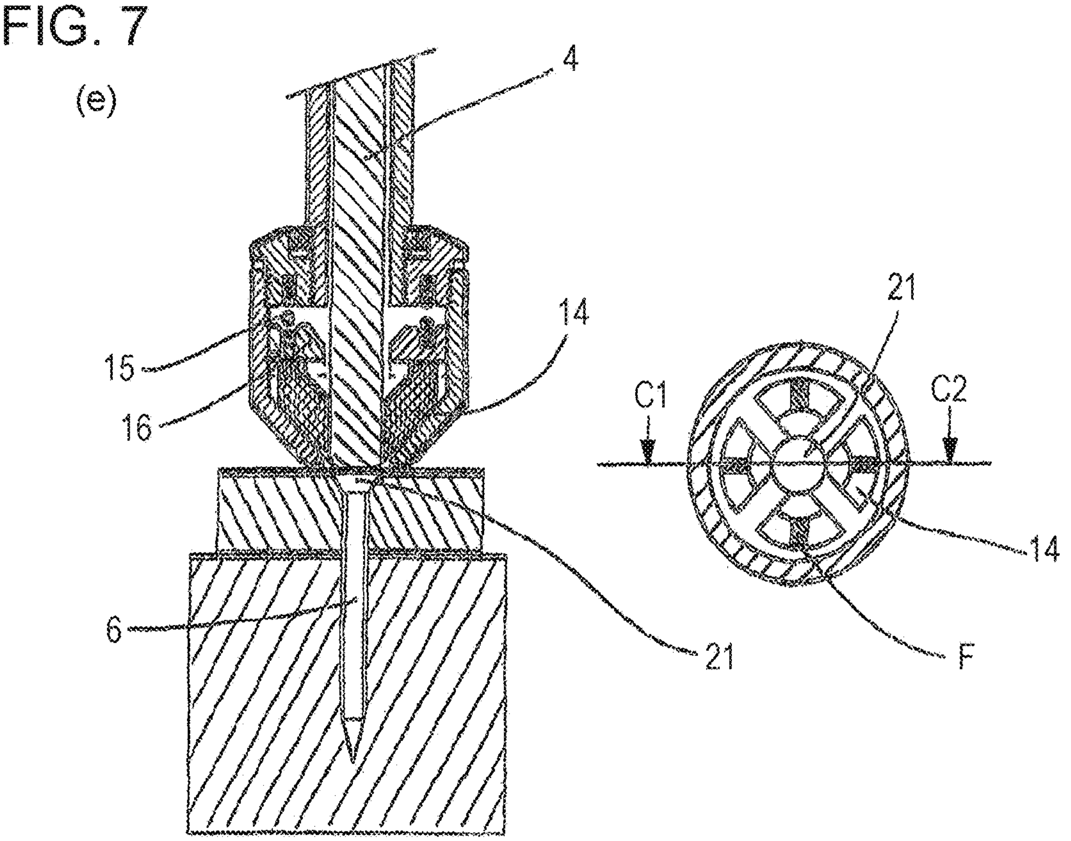
FIG. 7 is a sectional view at the portion along line C1-C2 of the nail tip guide tool and a positional plan view of the guide piece 14 showing a state at a point in time e in the work process of "Example 1".
Figure 8:
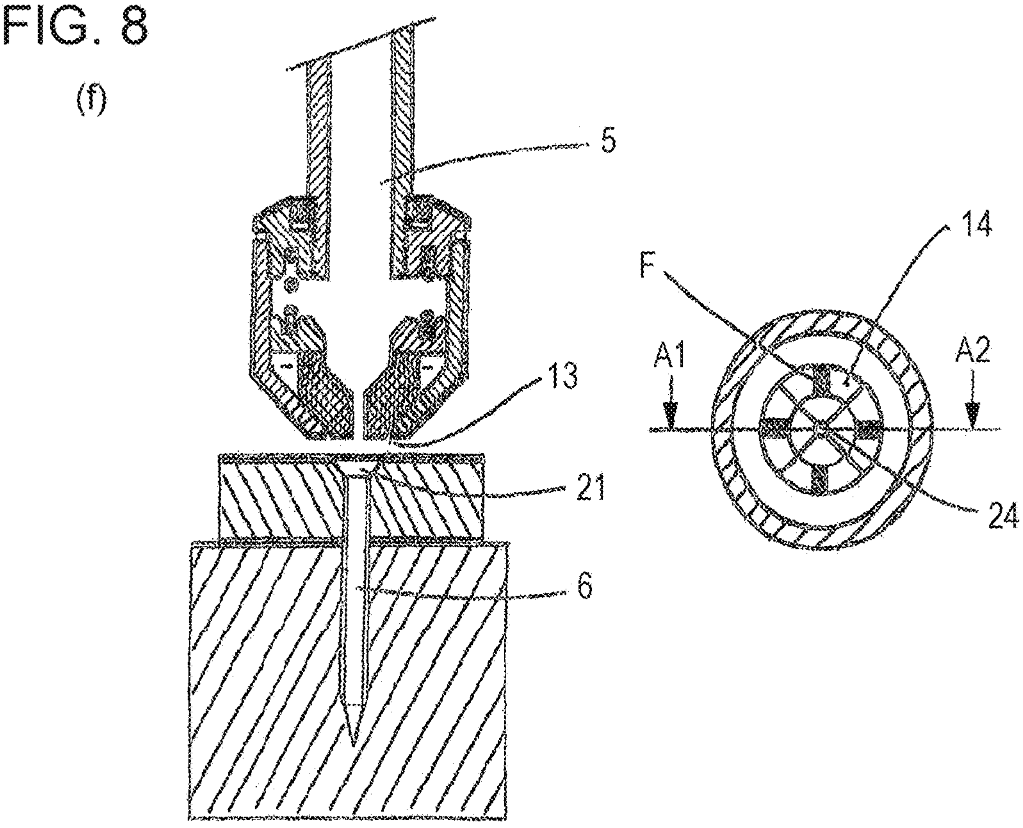
FIG. 8 is a sectional view at the portion along line A1-A2 of the nail tip guide tool and a positional plan view of the guide piece 14 showing a state at a point in time f (at the time of the end of nailing) in the work process of "Example 1".
Figure 9:
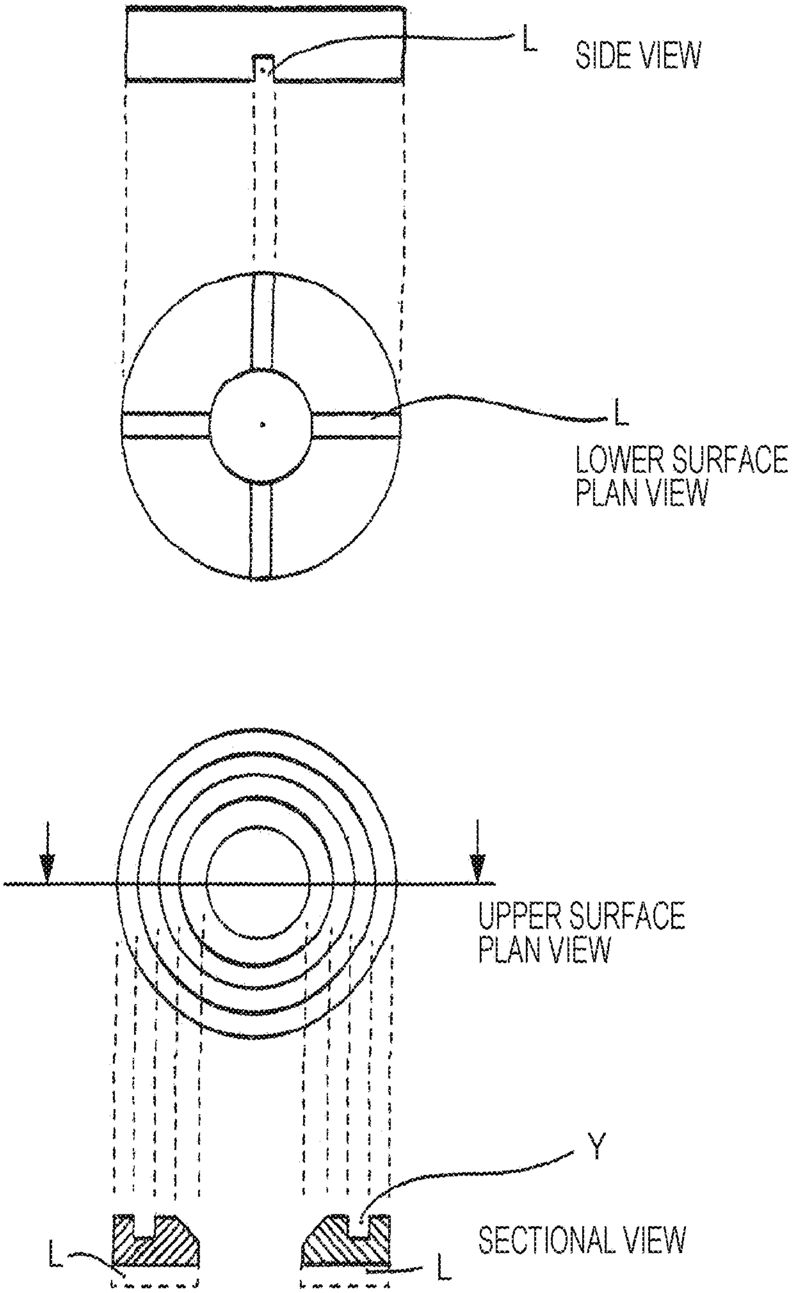
FIG. 9 is upper surface and lower surface plan views, a side view, and a sectional view of a torus-shaped press board.
Figure 10:
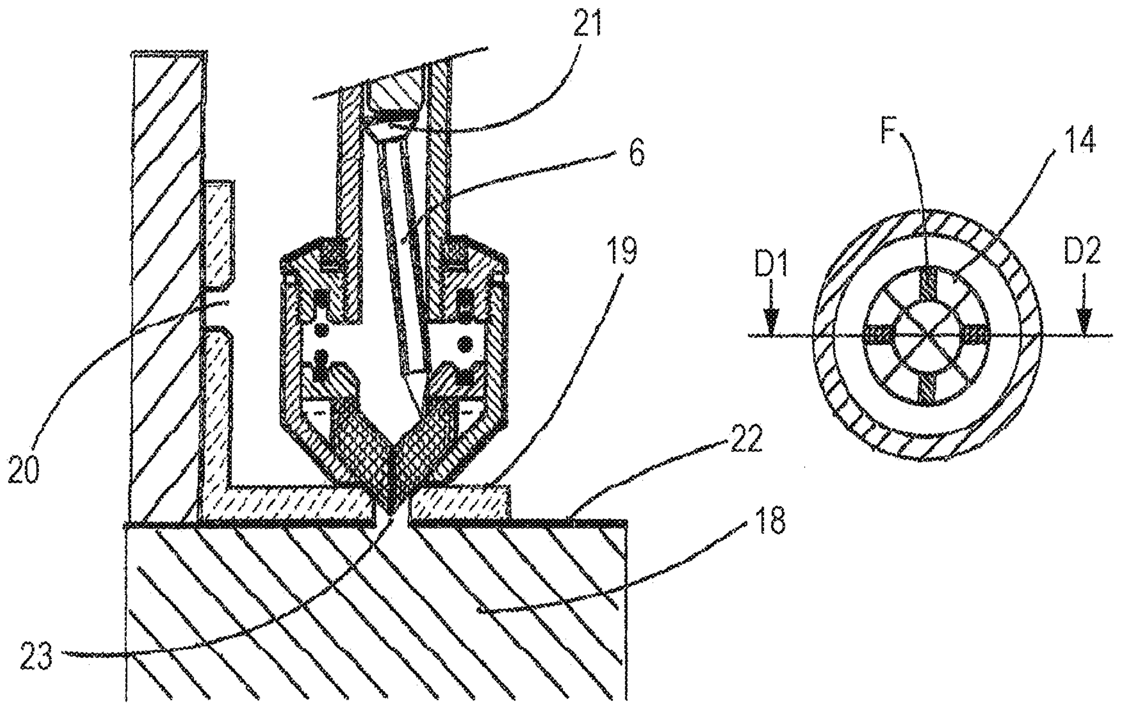
FIG. 10 is a sectional view at a portion along line D1-D2 of the nail tip guide tool and a positional plan view of the guide piece 14 showing a state at a point in time a (at the time of the start of nailing) in a work process of "Example 2".
Figure 11:
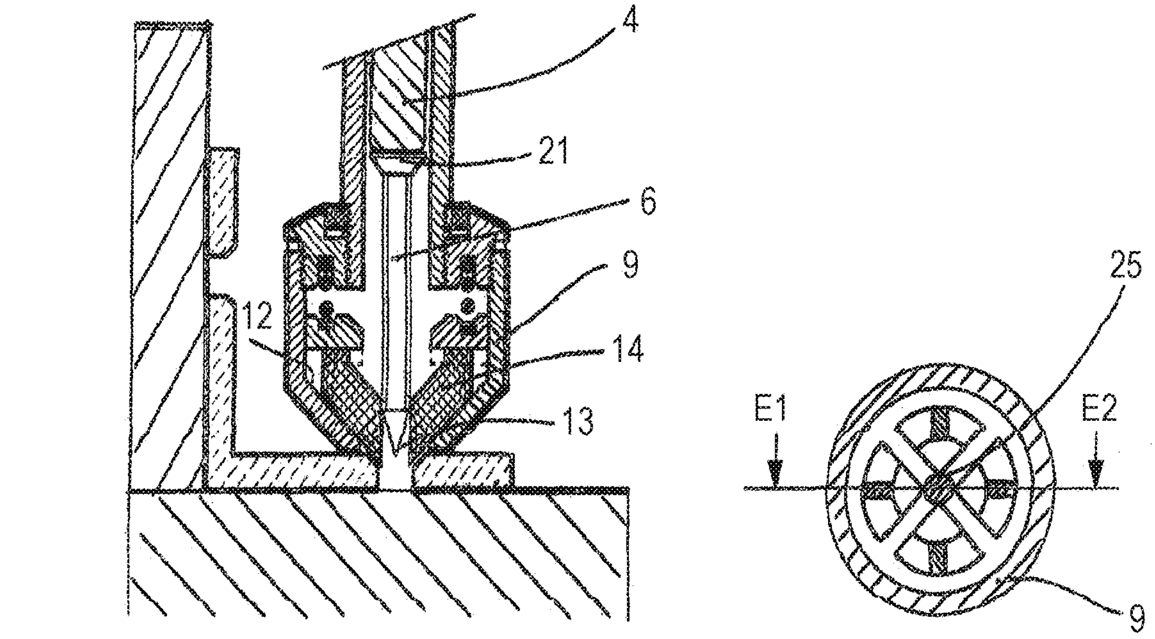
FIG. 11 is a sectional view at a portion along line E1-E2 of the nail tip guide tool and a positional plan view of the guide piece 14 showing a state at a point in time b in the work process of "Example 2".
Figure 12:
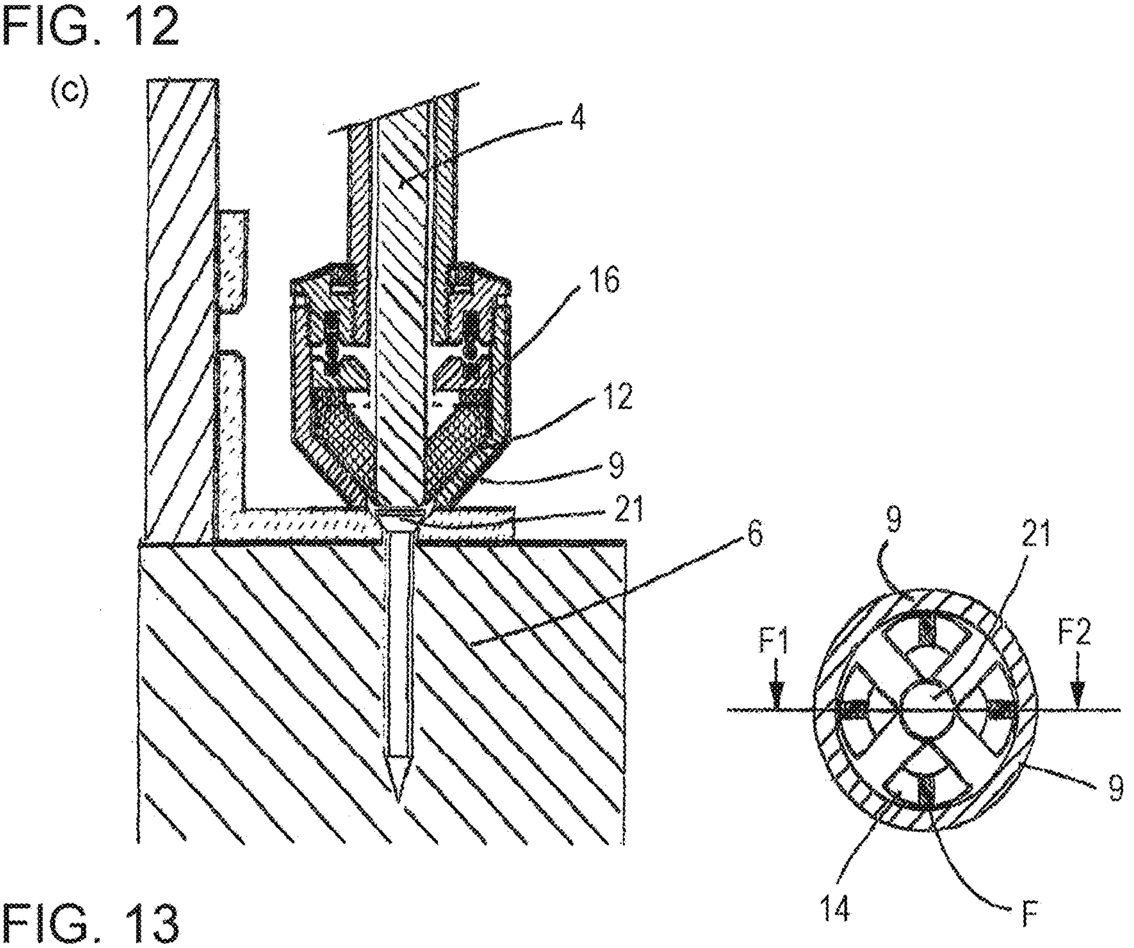
FIG. 12 is a sectional view at a portion along line F1-F2 of the nail tip guide tool and a positional plan view of the guide piece 14 showing a state at a point in time c in the work process of "Example 2".
Figure 13:
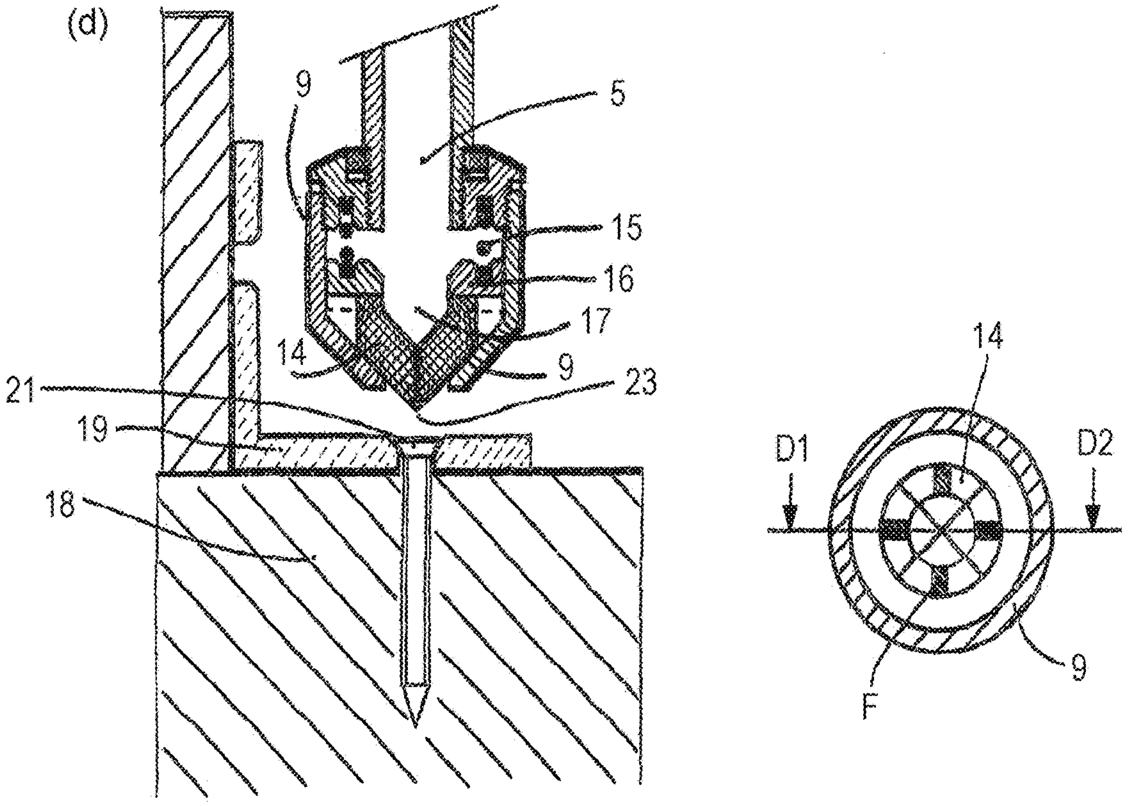
FIG. 13 is a sectional view at the portion along line D1-D2 of the nail tip guide tool and a positional plan view of the guide piece 14 showing a state at a point in time d (at the time of the end of nailing) in the work process of "Example 2".
Figure 14:
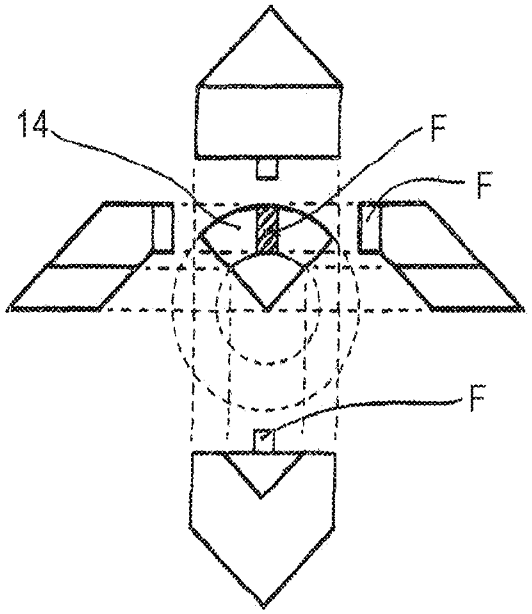
FIG. 14 is a plan view and a side view of a guide piece of a type having a conical tip.
Figure 15:
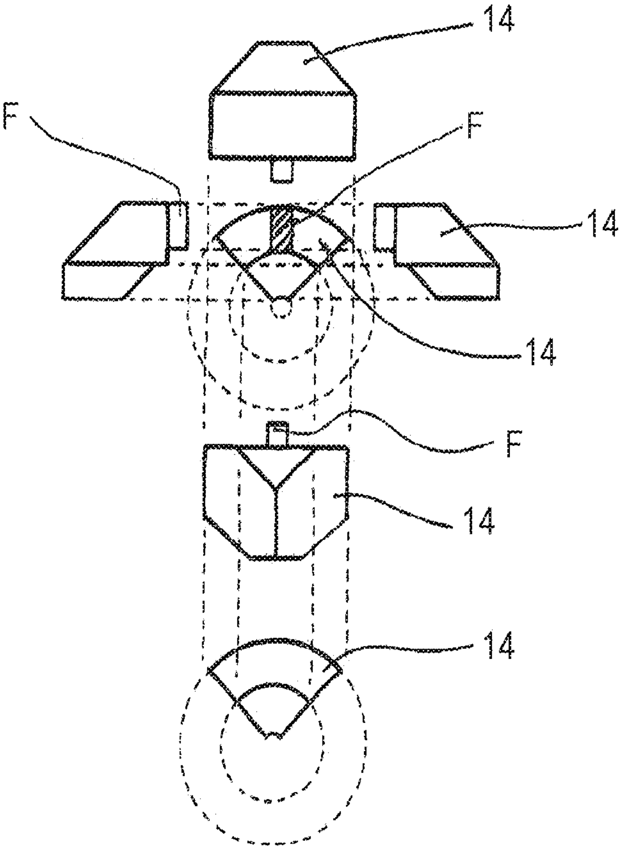
FIG. 15 is a plan view and a side view of a guide piece of a type having a general tip.
Figure 16:
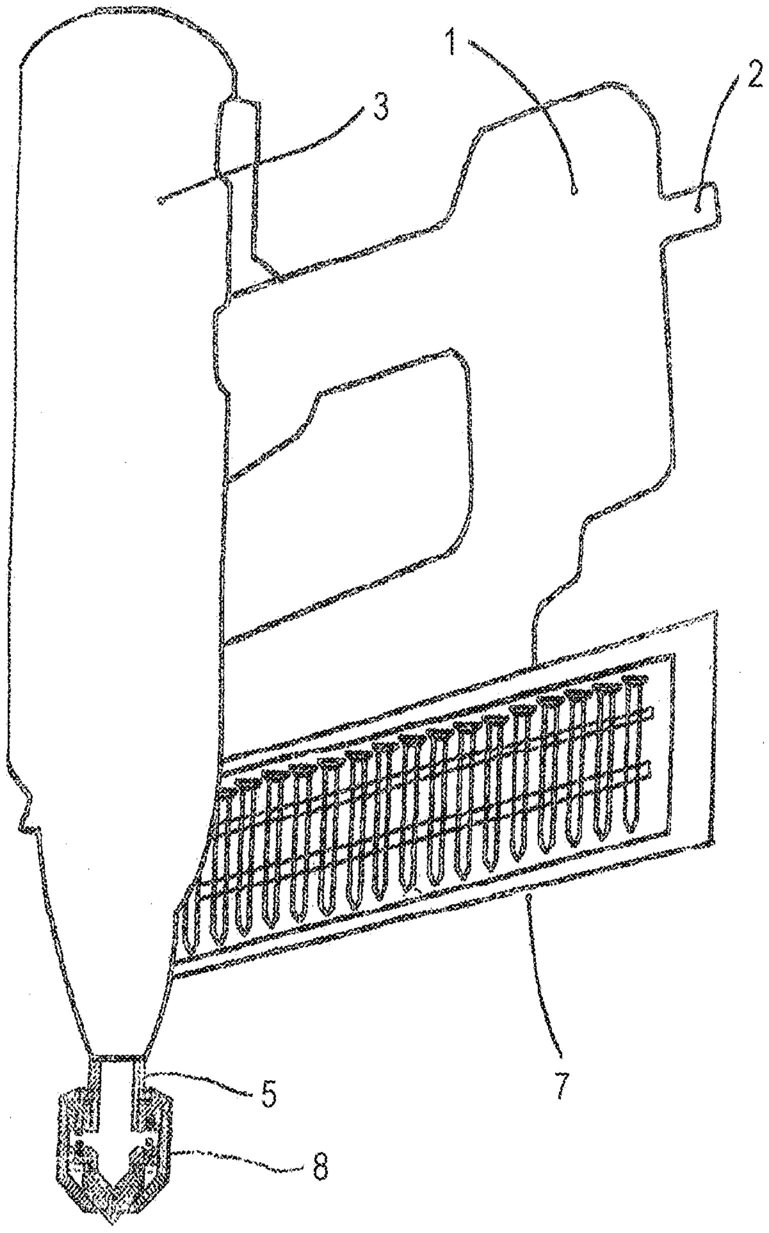
FIG. 16 is a schematic diagram showing a state where the "nail tip guide tool" of the present invention is mounted to a schematic nailing machine.
Figure 17:
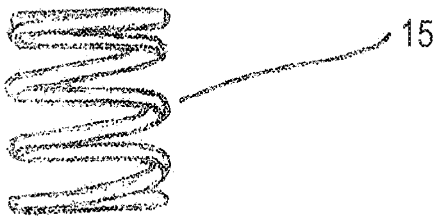
FIG. 17 is a side view of a coil spring.

1 outline of air nailing machine
2 grip portion of air hose from compressor
3 body portion of nailing machine
4 driver for driving nail
5 nose portion forming passage for nail to be driven
6 driven nail.
7 magazine portion for connected nails
8 nail tip guide tool of the present invention
9 funnel-shaped container member
10 lid member of funnel-shaped container member
11 screw thread provided at lid member to correspond to screw thread provided at outer peripheral portion of lower end of nose portion 5
12 inclined bottom surface portion at bottom portion of funnel-shaped container member
13 opening portion of central portion of bottom portion of funnel-shaped container member
14 guide piece.
15 coil spring.
16 torus-shaped press board
17 mortar-shaped guide recess portion that is created by gathering a plurality of guide pieces
18 base structural material for mounting L-shaped reinforcing hardware
19 reinforcing metal fitting
20 round hole provided at nailing position of reinforcing metal fitting
21 nail head
22 surface of base material when mounting reinforcing metal fitting
23 conical tip portion at lower end portion of guide piece required when mounting reinforcing metal fitting or the like
24 small-diameter through-hole provided from central portion when guide piece is in a mortar shape
25 nail shaft.
26 screw threads provided at both of funnel-shaped container member 9 and lid member of funnel-shaped container member for screwing
L recessed rail provided on lower surface of press board.
F protrusion portion provided on upper surface of guide piece
Y coil spring receiving groove provided on upper surface of torus-shaped press board
P coil spring receiving groove in lid member 10 of funnel-shaped container member

The invention claimed is:

1. A nail tip guide tool of a nailing machine, which is used by being mounted to a tip portion of a nose portion forming a passage for driving out various nails from the air the nailing machine, the nail tip guide tool comprising:

a guide piece molded such that when a plurality of guide pieces are gathered together at a central portion of an inclined bottom surface of a funnel-shaped container, a mortar-shaped recess portion is formed at a central portion of an upper surface of an aggregate of the plurality of guide pieces;

a protrusion portion provided on an outer peripheral portion of an upper surface of the guide piece and fitted into a recessed rail radially provided on a lower surface of a torus-shaped press board;

a coil spring having extension elasticity is fitted into both a circular groove for receiving the coil spring, which is provided on an upper surface of the torus-shaped press board, and a circular groove for receiving the coil spring, which is provided on a lower surface of a lid of the funnel-shaped container;

the lid of the funnel-shaped container and the funnel-shaped container are joined together by screw threads provided at the lid and the funnel-shaped container;

the nailing machine and the nail tip guide tool are joined together by a screw thread provided at the lid of the funnel-shaped container to correspond to a screw thread provided at an outer peripheral portion of the tip portion of the nose portion of the nailing machine;

a tip of a nail driven in a tilted posture from the nose portion is guidable to a central portion of the mortar-shaped recess portion; and the nail is capable of being pushed in at a position of the central portion of the mortar-shaped recess portion so that the plurality of guide pieces are pushed and expanded to right and left and grip and surround a nail shaft portion of the nail to straighten a posture of the nail.

2. The nail tip guide tool of the nailing machine according to claim 1, wherein an inclination angle of the inclined bottom surface of the funnel-shaped container is approximately 45°, and a number of the plurality of guide pieces is 3.

3. The nail tip guide tool of the nailing machine according to claim 1, wherein a through-hole having a diameter smaller than a shaft diameter of the nail to be used is provided from a bottom portion of a center of the mortar-shaped recess portion formed by gathering the plurality of guide pieces toward the central portion of the inclined bottom surface to lower end portions of the plurality of guide pieces.

4. The nail tip guide tool of the nailing machine according to claim 1, wherein in a state where the plurality of guide pieces are gathered at a center, lower end portions of the plurality of guide pieces form a conical shape when gathered, and a conical portion protrudes from a lower end portion of the funnel-shaped container.

5. The nail tip guide tool of the nailing machine according to claim 1, wherein in a state where the plurality of guide pieces are gathered at a center, lower end portions of the plurality of guide pieces are located at a same level as or higher than a lower end portion of the funnel-shaped container when gathered.

6. A nailing machine with the nail tip guide tool, in which the nail tip guide tool according to claim 1 is mounted to the nose portion of the nailing machine.

* * * * *